United States Patent [19]

Schroeck

[11] 4,254,257
[45] Mar. 3, 1981

[54] AMINE SALTS OF ACIDIC MICROBIAL POLYSACCHARIDES AND THEIR USE IN RECOVERY OF SUCH POLYSACCHARIDES

[75] Inventor: Calvin W. Schroeck, Eastlake, Ohio

[73] Assignee: The Lubrizol Corporation, Wickliffe, Ohio

[21] Appl. No.: 13,507

[22] Filed: Feb. 21, 1979

Related U.S. Application Data

[63] Continuation-in-part of Ser. No. 742,717, Nov. 17, 1976, abandoned, which is a continuation-in-part of Ser. No. 652,007, Jan. 26, 1976, abandoned.

[51] Int. Cl.³ .............................................. C08B 37/00
[52] U.S. Cl. .................................. 536/52; 252/8.5 R; 252/315; 426/658; 536/18; 424/361; 424/363; 536/114
[58] Field of Search ........................... 536/18, 114, 52

[56] References Cited

U.S. PATENT DOCUMENTS

| | | | |
|---|---|---|---|
| 3,119,812 | 1/1964 | Rogovin et al. | 536/51 |
| 3,232,929 | 2/1966 | McNeely | 536/114 |
| 3,244,695 | 4/1966 | Schweiger | 536/52 |
| 3,280,102 | 10/1966 | Gordon et al. | 536/114 |
| 3,281,329 | 10/1966 | Lipps, Jr. | 435/104 |
| 3,316,241 | 4/1967 | Leder et al. | 536/114 |
| 3,328,262 | 6/1967 | Lindblom et al. | 435/3 |
| 3,349,077 | 10/1967 | Schweiger | 536/120 |
| 3,422,085 | 1/1969 | Gill et al. | 536/18 |
| 3,598,730 | 8/1971 | Nordgren et al. | 536/114 |
| 3,632,570 | 1/1972 | Gill | 536/1 |
| 3,711,462 | 1/1973 | Abdo | 536/1 |
| 3,729,460 | 4/1973 | Patton | 536/114 |
| 3,773,752 | 11/1973 | Buchanan | 536/1 |
| 3,928,316 | 12/1975 | Jordan et al. | 536/52 |

*Primary Examiner*—Johnnie R. Brown
*Attorney, Agent, or Firm*—William H. Pittman; Daniel N. Hall; Raymond F. Keller

[57] ABSTRACT

Acidic polysaccharides of the type obtainable by microbial fermentation of an organic material such as a carbohydrate (e.g., xanthan gum) form novel amine salts with aliphatic or alicyclic polyamines having at least three amino nitrogen atoms and a molecular weight of at least 150. The amine salts may be used for isolation of the microbial polysaccharide from its fermentation broth by a process comprising the steps of acidifying, forming the amine salt by adding the amine or a salt thereof, and reducing the inorganic salt concentration as necessary (e.g., by dilution).

22 Claims, No Drawings

AMINE SALTS OF ACIDIC MICROBIAL POLYSACCHARIDES AND THEIR USE IN RECOVERY OF SUCH POLYSACCHARIDES

This application is a continuation-in-part of copending application Ser. No. 742,717, filed Nov. 17, 1976, which in turn is a continuation-in-part of Ser. No. 652,007, filed January 26, 1976, both now abandoned.

This invention relates to new compositions of matter and a method for their use. In particular, the invention comprises methanol-insoluble amine salts of acidic polysaccharides produced by microbial fermentation wherein the amine is at least one aliphatic or alicyclic polyamine containing at least three amino nitrogen atoms.

The microbial production of polysaccharides by fermentation of organic compounds (especially carbohydrates such as sugar and starch) in the presence of a suitable microorganism is a well known procedure. The products (hereinafter sometimes called "microbial polysaccharides"), typically acidic water-soluble gums, are useful in many applications including the preparation of foodstuffs and cosmetics and in secondary and tertiary oil recovery.

Several methods have been known for the isolation of the microbial polysaccharide from the fermentation broth. One requires dilution of the broth with a large amount of a water-miscible solvent such as 2-propanol, whereupon the polysaccharide precipitates and may be removed by filtration or an equivalent procedure. Others are the precipitation of an insoluble calcium salt of the polysaccharide, followed by acidification, and precipitation by the use of a long chain amine or quaternary ammonium salt. All of these methods are either cumbersome (e.g., because of the large amount of diluting solvent required), expensive (e.g., because of the relatively high cost of lime, quaternary ammonium salts, etc.), or both.

A principal object of the present invention, therefore, is to provide new compositions of matter comprising amine salts of acidic microbial polysaccharides.

A further object is to provide a novel method for recovering acidic microbial polysaccharides from the fermentation broth in which they are produced.

A further object is to provide a recovery method which requires the use of a minimum of processing steps and expensive chemicals.

A still further object is to provide a method for recovering acidic microbial polysaccharides in usable form by a relatively convenient, easily employed procedure.

Other objects will in part be obvious and will in part appear hereinafter.

Microbial polysaccharides and the methods for their production are well known, having been described in a large number of publications and patents. In general, they involve the cultivation of a suitable microorganism in an aqueous fermentation medium containing a carbohydrate, normally under neutral or near-neutral conditions. The microorganisms, many of which are disclosed in U.S. Pat. No. 3,406,114, from the following list which produce acidic products are illustrative of those suitable for this purpose, with those marked with an asterisk being illustrative of those especially suitable.

Algae:
  Chlorella vulgaris
  Chlorella pyrenoidosa
  Chlorococcum sp.
Bacteria:
  Alcaligenes faecalis ATCC 212
  Arthrobacter viscosus NRRL B-1973*, B-1797
  Arthrobacter globiforme* NRCC
  Arthrobacter stabilis NRRL B-3225
  Azotobacter indicum* (Beijerinckia indicum)
  Azotobacter vinelandii
  Bacillus ethanicus
  Bacillus polymyxa
  Bacillus subtilis NRCC 2035
  Bacterium aliphaticum liquefaciens
  Bacterium hedium
  Bacterium oligocarbophilus
  Beggeotoa alba
  Chromobacterium violaceum
  Corynebacterium equi subsp. mucilaginosus ATCC 21521
  Corynebacterium fascians
  Corynebacterium fiaccumfaciens*
  Corynebacterium insidiosum 110 Starr
  Corynebacterium michiganense
  Corynebacterium rathayii
  Corynebacterium sepedonicum
  Corynebacterium tritici
  Klebsiella aerogenes
  Methanomonas methanica
  Pseudomonas methanica*
  Rhizobium leguminosarum
  Sphaerotilus natans
  Streptomyces sp.
  Thixotrix nivea
  Xanthomonas campestris* NRRL B-1459
  Xanthomonas carotae NRCC 10547
  Xanthomonas hederae
  Xanthomonas hyacinthii NRCC 12612
  Xanthomonas maculofoliigardeniae NRCC 10201
  Xanthomonas malvaccarum NRCC 12131
  Xanthomonas oryzae
  Xanthomonas papavericola
  Xanthomonas phaseoli NRCC 11766
  Xanthomonas pruni
  Xanthomonas stewartii
  Xanthomonas translucens NRCC 10772
  Xanthomonas vesicatoria
  Xanthomonas vignicola NRCC 11648
  Zoogloca ramigera
Fungi:
  Aspergillus fischerii
  Aspergillus niger
  Aspergillus parasitious QM 884
  Aspergillus sulphureous
  Aspergillus sydowi
  Candida heveanensis NRRL Y-1510
  Claveria cinerea
  Coccidioides immitis
  Coprinus atramentericus
  Cryptococcus albidus NRRL Y-1516, Y-1400
  Crytococcus diffluens* NRRL Y-1505, Y-1517
  Cryptococcus flavescens NRRL Y-1401
  Cryptococcus laurentii var. flavescens
  Cryptococcus luteolus NRRL Y-986
  Cylindrocorpon radiciola
  Dacrymyces palmatus
  Dictyostelium discoideum
  Fumago vagans
  Fusarium aquiductum (low pH)
  Fusarium lini

*Fusarium moniliforme (Gibberella fujikuroi)* NRRL B-1951
*Fusarium solani**
*Hansenula capsulata* NRRL Y-1842
*Hansenula holstii* NRRL Y-2448, Y-2154
*Leptomitus lacteus*
*Lipomyces lipofera* NRRL Y-1351
*Mucor racemosus**
*Penicillium brevi-compactum*
*Penicillium capreolinum* NRRL Y-1510
*Penicillium charlesii*
*Penicillium digitatum*
*Penicillium expansum**
*Penicillium javanicum*
*Penicillium luteum*
*Penicillium nigricans*
*Penicillium rugulosum*
*Penicillium schlerotiorium*
*Penicillium varians*
*Penicillium vinaceum*
*Pestalotia ramulosa*
*Phymototrichum omnivorum*
*Rhodotorula mucilaginosa**
*Schizophyllum commune**
*Selenaspora sp.*
*Stysanus stenionites*
*Tremella braziliensis**
*Tremella encephala*
*Tremella foliaceae*
*Tremella mesenterica**
*Tremella subanomala*
*Tricholoma personatum*
*Trichoderma viride**
*Tephrina sp.* NRRL YB-3638
*Torulopsis rotundata* NRRL Y-1510
Unidentified black yeast NRRL Y-6272
Protozoa: *Carchesium sp.*

For the purpose of this invention, the most suitable polysaccharides are those produced by carbohydrate fermentation in the presence of the *Xanthomonas campestris* bacteria, especially *Xanthomonas campstris* NRRL B-1459. The acidic polysaccharide product produced by the last-named bacterium is commonly known as "xanthan gum."

The amines from which the amine salts of this invention are prepared are aliphatic or alicyclic polyamines having a molecular weight of at least 150 and containing at least three amino (i.e., basic) nitrogen atoms. Many amines of this type are known, including the following:

Alkylene polyamines, including the ethylene, propylene, butylene and pentylene polyamines. Specific examples include di(heptamethylene)triamine, tripropylene tetramine, tetraethylene pentamine and pentaethylene hexamine, as well as similar compounds in which the various alkylene groups are of differing chain lengths.

Aminoalkyl-substituted imidazolines and piperazines related to the above-described polyamines, such as 2-heptyl-1-(2-aminopropyl)imidazoline and 2-methyl-1-(2-aminobutyl)piperazine.

Polyamines prepared by cyanoethylation of such materials as ammonia, alkylene polyamines, alkanolamines, aliphatic or alicyclic ketones, polyhydric alcohols, or heterocyclic amines (e.g., morpholine, piperidine, piperazine) followed by reduction (e.g., hydrogenation) of the cyano groups.

Coupling products prepared by reaction of formaldehyde or a formaldehyde-producing substance (e.g., paraformaldehyde, trioxane) with any of the foregoing.

Homologs of the foregoing in which one or more hydrogen atoms bound to amino nitrogen are replaced by methyl groups.

An especially useful class of polyamines, partially by reason of their ready availability, are those having the formula:

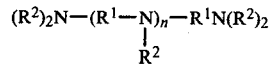

in which n is an integer which is at least 1 and usually no higher than about 10, each $R^1$ is independently a divalent aliphatic or alicyclic radical (usually an alkylene radical) having from 2 to about 18 and preferably from about 2 to about 6 carbon atoms, and each $R^2$ is independently hydrogen or lower alkyl (i.e., alkyl having at most 7 carbon atoms) and is usually hydrogen or methyl. Alkylene polyamines in which all $R^1$ radicals are identical and each $R^2$ is hydrogen are particularly preferred; and the ethylene polyamines, examples of which are mentioned above, are especially desirable for reasons of cost and effectiveness. Ethylene polyamines are described in detail under the heading "Diamines and Higher Amines" in Kirk-Othmer, *Encyclopedia of Chemical Technology*, Second Edition, Vol. 7, pp. 22–39. They are prepared most conveniently by the reaction of ethylene chloride or an ethylene imine with ammonia. These reactions result in the production of complex mixtures of alkylene polyamines, including cyclic condensation products such as piperazines; and mixtures are particularly useful for the preparation of the amine salts of this invention.

The minimum amine molecular weight of 150 is important, since amines with lower molecular weights are inoperative or, at best, marginally operative in the method for precipitating the microbial polysaccharide described hereinafter. However, it is within the scope of the invention to use commercially available amine mixtures consisting predominantly of amines (e.g., ethylene polyamines) with molecular weights higher than 150 but also containing lower molecular weight amines. The latter are not equivalent to the former and are not included within the scope of the word "amine" or other terms used herein to refer to specific amine subgenera and species with reference to the invention, but their presence is not detrimental.

The amine salts of this invention are insoluble in methanol, and this property is often crucial with respect to the utility of the amine salts in the recovery of microbial polysaccharides as described hereinafter. In this respect the amine salts of the present invention differ from the materials obtained by reacting microbial polysaccharides such as xanthan gum with long chain amines or quaternary ammonium salts, since the latter are soluble in methanol.

Another aspect of the present invention is a novel method for recovering acidic microbial polysaccharides from an aqueous mixture comprising a fermentation broth which comprises the steps, performed in any order, of:

(A) Adjusting the mixture to a final pH within the range of about 2.5–5.5;

(B) Adding to the mixture at least one amine as described hereinabove, or a salt of said amine, whereby an amine salt according to this invention is ultimately formed; and (C) Reducing the inorganic salt concentration of the mixture as necessary to effect precipitation of said amine salt according to this invention therefrom.

This aspect is based on the discovery that acidic microbial polysaccharides, especially xanthan gum, may be precipitated as their amine salts by carrying out a series of steps more fully described hereinafter. The material subject to these steps is a fermentation broth containing xanthan gum or a similar acidic microbial polysaccharide, the microbe which has produced the polysaccharide, and other materials including various inorganic ions such as phosphate, nitrate, potassium and magnesium. The fermentation reaction is typically initiated by means of a seed culture which may contain an enzymatic protein material such as soy peptone. The pH of the fermentation broth, as previously noted, is usually neutral or nearly so, typically 6.8–7.2.

Step A of the method of this invention is the reduction of the pH of the mixture comprising the fermentation broth to a final value within the range of about 2.5–5.5. (By "final value" is meant the value during or just prior to precipitation of the microbial polysaccharide; that is, after steps A, B and C as described herein have been completed.) The preferred range is about 2.8–4.2, and the optimum range is 3.7–3.8. The pH adjustment is normally done by adding an acidic material to the mixture comprising the fermentation broth. The acid used may be an inorganic or an organic acid but is preferably inorganic; it may be monobasic or polybasic but is preferably monobasic. Within these classes, the identity of the acid is not critical since the crucial fact is reduction of the pH, not the identity of the acid used to effect the reduction. Typical suitable inorganic monobasic acids are hydrochloric and hydrobromic acids; suitable polybasic inorganic acids include sulfuric and phosphoric acids, with the latter being preferred. Among organic acids, the carboxylic acids are preferred, especially monocarboxylic acids and particularly those with 1–10 carbon atoms such as formic, acetic, propionic, butyric, valeric and lactic acids, with lactic acid being especially suitable.

Step B is the addition to the mixture comprising the fermentation broth of at least one amine as described hereinabove, or a salt of said amine (preferably a salt of a mineral acid such as hydrochloric acid). Since the pH established in step A is in the acidic range, the amine will be present as its salt with the acid used in step A until acid exchange with the acidic microbial polysaccharide takes place to form the amine salt of this invention.

The amount of amine used in step B will depend to some extent on the pH established by step A and the amount of dilution or equivalent operation employed in step C. In general, it has been found that a minimum of about 0.08 part by weight of amine should be used per part of acidic microbial polysaccharide in the aqueous mixture. On the other hand, it is rarely necessary to use more than about 0.5 part of amine, and most often not more than 0.2 part, per part of microbial polysaccharide, although higher amounts are not detrimental.

In step C, the inorganic salt concentration of the mixture comprising the fermentation broth is reduced. The reduction may be accomplished by such methods as ion exchange, but it is usually convenient merely to dilute the mixture with water, about 0.5–5.0 and most often about 1.0–5.0 parts by weight of water generally being employed per part of fermentation broth.

The presence of step C in the method of this invention is based on the discovery that, in many instances, the presence of inorganic salts in concentrations comparable to those in the fermentation broth increases the solubility of the amine salt of the microbial polysaccharide. It is frequently possible, however, to adjust the parameters and conditions of steps A and B in order to make dilution (step C) unnecessary. For example, the xanthan gum amine salts of this invention will precipitate without dilution of its equivalent if a monobasic acid (e.g., hydrochloric or lactic acid) is used for pH adjustment in step A and the amount of amine used in step B is at least about 0.14 part by weight per part of xanthan gum. Depending upon the conditions of steps A and B, therefore, step C may be optional. Even if it is unnecessary, however, it is frequently preferred for reasons explained hereinafter.

As previously noted, the order in which the steps of the method of this invention are carried out is immaterial for the purposes of this invention; regardless of the order, precipitation of the amine salt will ultimately occur after all the steps described herein have been completed. Several factors may govern the order to steps. For example, the amine may be non-toxic to the microorganism employed for fermentation, and in that event the amine may be used to maintain the neutral environment needed during fermentation. (Use thereof perforce decreases the inorganic salt content of the mixture, thus providing conditions particularly conducive to precipitation.) Thus, the ethylene polyamines are non-toxic to many microorganisms including *Xanthomonas campestris* NRRL B-1459, and if they are used for pH control during the fermentation and are present in the requisite amount when fermentation is completed, later addition of amine will be unnecessary and steps B and C may immediately be performed to effect precipitation of the amine salt. On the other hand, some amines are toxic to the microorganism and if they are used, they must be added after fermentation is complete and pH control during fermentation must be effected by adding some other alkaline reagent such as sodium hydroxide or potassium hydroxide. When this is the case, steps A and B may be combined as by adding an acidic solution of the amine salt. This may also be done when the amine has been used for pH control during the fermentation but additional amine must subsequently be added.

Another factor affecting the order of steps is the desired physical state of the amine salt as precipitated. If step C is the last step performed or if it is unncessary because the conditions of steps A and B are adjusted in accordance with the description hereinabove, a fine precipitate is formed which is relatively free from entrained cells of microorganisms but which may be somewhat difficult to remove by filtration or the like. On the other hand, if step C precedes either or both of steps A and B the precipitate is frequently somewhat coarser and easier to filter, but may contain a substantial number of entrained microorganism cells.

The nature of the acid used in step A may also affect the coarseness of the precipitate. Monobasic acids generally give a coarse, easily separated precipitate while polybasic acids yield a fine precipitate. For certain uses, such as secondary or tertiary oil recovery, the presence of microbial cells in the product is undesirable and it will then be preferred to recover the microbial polysaccharide as a fine precipitate. In other uses, the presence of microbial cells is not detrimental and the coarser, more easily isolated precipitate is satisfactory. In any event, it is usually found that precipitation is improved if the aqueous mixture is gently agitated, as by gentle stirring, during the practice of the method of this invention.

Other factors which are frequently interrelated are the amount of amine used and the pH at which precipitation takes place. Thus, the use of relatively large amounts of amine in step B will result in precipitation at somewhat higher pH values (as provided by step A) than when lower amounts of amine are used. It has also been found that the use of a monocarboxylic acid such as lactic acid results in precipitation at somewhat higher pH values, frequently as high as 5.4–5.5 when the amount of amine is relatively high. For lower amounts of amine, a pH value of 4.2 or less may be necessary for precipitation.

The amines salts of this invention are easily dispersed in neutral or slightly acidic aqueous solutions, yielding low viscosity dispersions which do not exhibit the agglomeration or "clumping" phenomenon usually encountered when xanthan gum and similar acidic microbial polysaccharides are contacted with water. Upon addition to the aqueous dispersion of strong bases (e.g., sodium or potassium hydroxide), salts (e.g., sodium chloride, potassium nitrate) or an aqueous formaldehyde solution, a thickened aqueous solution is obtained by the action of the freed xanthan gum or similar polysaccharide.

If recovery of the amine from the amine salt is desired, the latter may be treated as a solid with a solution of strong base in a non-solvent for the free acidic polysaccharide (e.g., aqueous methanol), whereupon the amine is released in an interchange reaction.

The method of this invention is illustrated by the following examples. All percentages are by weight.

EXAMPLE 1

A seed culture is prepared from sterile solutions comprising 860 grams of water, 19.4 grams of glucose, 86 grams of an aqueous solution comprising 2% dipotassium hydrogen phosphate and 0.45% ammonium nitrate, 86 grams of an aqueous solution comprising 0.1% magnesium sulfate heptahydrate, and 2.6 grams of soy peptone. One hundred grams of the resulting solution is innoculated with a fresh culture of Xanthomonas campestris NRRL B-1459 and shaken in the dark at 29° C. for 25 hours. A 70-gram portion of the resulting broth is combined with the remainder of the aqueous solution and shaken at 29° C. for 54½ hours. The pH of the solution is periodically measured and adjusted to 6.8–7.2 by the addition of a sterile 10% aqueous solution of a commercial ethylene polyamine mixture approximately corresponding in molecular weight to pentaethylene hexamine (and referred to as such hereinafter); a total of 8 ml. of the pentaethylene hexamine solution is added. The resulting broth is used as a seed culture in later fermentations.

EXAMPLE 2

A sterile system comprising a resin flask, stirring means, liquid and gas addition means, temperature measuring means and reflux condensing means is charged with sterile solutions comprising 270 grams of glucose, 12 grams of dipotassium hydrogen phosphate, 7.2 grams of ammonium nitrate, 1.2 grams of magnesium sulfate heptahydrate, 3.6 grams of soy peptone and 12 liters of water. To the mixture is added 750 grams of the seed culture of Example 1, and the solution is purged with air and stirred at 28° C. in the dark for about 49½ hours. Periodic pH measurements are made and the pH is adjusted to 6.8–7.2 by the addition of a sterile 10% aqueous solution of pentaethylene hexamine. The glucose content of the solution is also checked periodically by means of Clinistix.

After 49½ hours, the broth tests negative for glucose and 800 ml. of a 2.6% aqueous phosphoric acid solution is added to reduce the pH to 3.5. Water, 18 liters, is added slowly followed by 50 grams of the pentaethylene hexamine solution. The total pentaethylene hexamine charged to the system by this time is 22.8 grams. The desired xanthan gum precipitates as a fine precipitate which is separated by centrifuging; the supernatant liquid is cloudy, indicating the presence therein of substantial quantities of microbial cells. The xanthan gum amine salt is washed with a methanolic solution of sodium hydroxide and then with methanol, and is dried in a vacuum oven. The yield is 150 grams.

EXAMPLE 3

A fermentation is carried out using the procedure of Example 2, except that 6 grams of soy peptone is used and the total weight of pentaethylene hexamine added during the fermentation is 15.9 grams. When the fermentation is complete, 11,200 ml. of water and 45 ml. of 10% aqueous pentaethylene hexamine solution are added, followed by a solution of 240 ml. of 1 M phosphoric acid in 800 ml. of water. The desired xanthan gum amine salt precipitates and the supernatant liquid is decanted. The product is washed with dilute phosphoric acid and slurried with methanol; to the slurry is added 22.8 grams of 50% aqueous sodium hydroxide solution. The xanthan gum is finally washed with methanol again and dried in a vacuum oven. The yield is 157 grams.

EXAMPLE 4

Following a procedure similar to that of Example 2, xanthan gum is prepared from 9.7 grams of glucose, 43 grams of an aqueous solution comprising 1% dipotassium hydrogen phosphate and 0.45% ammonium nitrate, 43 grams of a 0.1% aqueous solution of magnesium sulfate heptahydrate, 0.22 gram of soy peptone and 430 grams of water. pH adjustment during the fermentation is effected by the addition of 10% aqueous pentaethylene hexamine solution; a total of 12 ml. of such solution is added during the fermentation. Following the fermentation, an additional 1.2 ml. of pentaethylene hexamine solution is added and the pH is adjusted to 3.8 with 1 M hydrochloric acid. The desired xanthan gum amine salt precipitates and is separated; washed with water, dilute hydrochloric acid, a methanolic solution of sodium hydroxide, and aqueous methanol; and vacuum dried. The yield is 5.1 grams.

EXAMPLE 5

A xanthan gum amine salt is prepared by a method similar to that of Example 2, except that the pentaethylene hexamine is replaced by an approximately equivalent amount of tetraethylene pentamine.

EXAMPLE 6

A xanthan gum amine salt is prepared by a method similar to that of Example 2, except that the pentaethylene hexamine is replaced by an approximately equivalent amount of a commercial polyethylene polyamine mixture consisting principally of polyamines having a molecular weight between 150 and 275.

What is claimed is:

1. A methanol-insoluble amine salt of an acidic polysaccharide produced by microbial fermentation, wherein the amine is at least one aliphatic or alicyclic polyamine having a molecular weight of at least 150 and containing at least three amino nitrogen atoms.

2. An amine salt according to claim 1 wherein the amine is at least one alkylene polyamine of the formula

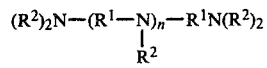

wherein n is an integer which is at least 1, each $R^1$ is independently a divalent hydrocarbon radical having about 2–18 carbon atoms, and each $R^2$ is independently hydrogen or lower alkyl.

3. An amine salt according to claim 2 wherein the polysaccharide is xanthan gum.

4. An amine salt according to claim 3 wherein each $R^1$ is the same and is an alkylene radical having 2–6 carbon atoms and each $R^2$ is independently hydrogen or methyl.

5. An amine salt according to claim 4 wherein each $R^2$ is hydrogen.

6. An amine salt according to claim 5 wherein the amine is at least one ethylene polyamine.

7. A method for recovering an acidic polysaccharide produced by microbial fermentation from an aqueous mixture comprising a fermentation broth which comprises the steps, performed in any order, of:

(A) Adjusting the mixture to a final pH within the range of about 2.5–5.5;

(B) Adding to the mixture at least one aliphatic or alicyclic polyamine having a molecular weight of at least 150 and containing at least three amino nitrogen atoms, or a salt of said amine, whereby an amine salt according to claims 1, 4, 5 or 6 is ultimately formed; and (C) Reducing the inorganic salt concentration of the mixture as necessary to effect precipitation of the amine salt of said acidic polysaccharide therefrom.

8. A method according to claim 7 wherein step A comprises adding an acid to the mixture.

9. A method according to claim 8 wherein the amount of acid added is such as to attain a final pH of 2.8–4.2.

10. A method according to claim 9 wherein the acid is a monobasic inorganic acid.

11. A method according to claim 10 wherein the acid is hydrochloric acid.

12. A method according to claim 11 wherein the acid is a monocarboxylic acid.

13. A method according to claim 12 wherein the acid is lactic acid.

14. A method according to claim 9 wherein step C is effected by diluting the mixture with water.

15. A method according to claim 14 wherein the amount of water used for dilution is about 0.1–5.0 parts by weight per part of broth.

16. A method according to claim 15 wherein the acid used in step A is a monobasic inorganic acid.

17. A method according to claim 16 wherein the acid is hydrochloric acid.

18. A method according to claim 15 wherein the acid is a monocarboxylic acid.

19. A method according to claim 16 wherein the acid is lactic acid.

20. A method according to claim 15 wherein the acid used in step A is a polybasic inorganic acid.

21. A method according to claim 9 wherein the final pH after step A is 3.7–3.8.

22. A method for recovering xanthan gum from an aqueous mixture comprising a fermentation broth containing *Xanthomonas campestris* NRRL B-1459 which comprises the steps, performed in any order, of (A) adding hydrochloric acid to the mixture in an amount to attain a final pH of 3.7–3.8; (B) adding a commercially available amine mixture consisting predominantly of ethylene polyamines having a molecular weight of at least 150, or a salt of said amine mixture, whereby an amine salt of said xanthan gum is ultimately formed; (C) diluting with about 0.5–5.0 parts by weight of water per part of broth, and recovering the precipitated product.

* * * * *